(12) United States Patent
Rodriguez et al.

(10) Patent No.: US 8,793,402 B2
(45) Date of Patent: Jul. 29, 2014

(54) SYNCHRONIZING TIME ACROSS A PLURALITY OF DEVICES CONNECTED TO A NETWORK

(75) Inventors: Adrian X. Rodriguez, Durham, NC (US); Nicholas R. Sandonato, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 392 days.

(21) Appl. No.: 13/218,843

(22) Filed: Aug. 26, 2011

(65) Prior Publication Data

US 2013/0054839 A1 Feb. 28, 2013

(51) Int. Cl.
*G06F 15/16* (2006.01)
*H04L 29/08* (2006.01)
*H04L 29/06* (2006.01)

(52) U.S. Cl.
CPC ............ *H04L 67/1095* (2013.01); *H04L 69/28* (2013.01)
USPC .......................................... 709/248; 370/230

(58) Field of Classification Search
CPC ................................................. H04L 67/1095
USPC ........... 709/248; 345/661, 440; 713/600, 401; 707/999.1
See application file for complete search history.

(56) References Cited

U.S. PATENT DOCUMENTS

| 5,907,685 | A | 5/1999 | Douceur |
| 6,351,821 | B1 * | 2/2002 | Voth .............................. 713/600 |
| 6,944,636 | B1 | 9/2005 | Starbuck |
| 6,950,835 | B1 | 9/2005 | Starbuck |
| 7,542,485 | B2 * | 6/2009 | Bingham et al. .............. 370/507 |
| 7,715,193 | B1 | 5/2010 | Ye et al. |
| 2004/0012582 | A1 | 1/2004 | Kim |
| 2008/0240075 | A1 * | 10/2008 | Yamaji .......................... 370/350 |
| 2009/0086764 | A1 | 4/2009 | Lee et al. |
| 2009/0168703 | A1 * | 7/2009 | Pandey et al. ................. 370/329 |
| 2010/0202436 | A1 | 8/2010 | Albert et al. |
| 2010/0238917 | A1 | 9/2010 | Silverman et al. |
| 2012/0084062 | A1 * | 4/2012 | Maturana et al. ................. 703/6 |

* cited by examiner

*Primary Examiner* — Waseem Ashraf
*Assistant Examiner* — Charles Murphy
(74) *Attorney, Agent, or Firm* — Brandon C. Kennedy; Katherine S. Brown; Biggers Kennedy Lenart Spraggins LLP

(57) ABSTRACT

Methods, apparatuses, and computer program products for synchronizing time across a plurality of devices connected to a network are provided. Embodiments include detecting, by a particular device, a synchronization initiation event; in response to detecting the synchronization initiation event, broadcasting, by the particular device to each device of the plurality of devices, a synchronization request; receiving, by the particular device, a plurality of time acknowledgments from the plurality of devices, each time acknowledgement indicating a current time of a device and a device initialization time indicating a time that the device last set the current time of the device; selecting, from the plurality of time acknowledgements the time acknowledgement with the shortest duration between an indicated device initialization time and an indicated current time of a device; and setting a current time of the particular device based on the current time indicated in the selected time acknowledgment.

20 Claims, 4 Drawing Sheets

SYNCHRONIZING TIME ACROSS A PLURALITY OF DEVICES CONNECTED TO A NETWORK

BACKGROUND OF THE INVENTION

1. Field of the Invention

The field of the invention is data processing, or, more specifically, methods, apparatuses, and computer program products for synchronizing time across a plurality of devices connected to a network.

2. Description of Related Art

When multiple devices are connected to a network, the internal clocks of the multiple devices may need to be synchronized in order to perform certain network operations, such as data transmission. Even when initially set accurately, the internal clock of the devices will differ after some amount of time due to clock drift, caused by clocks counting time at slightly different rates. In a centralized system, a centralized time server may be used to dictate the system time to all of the devices on the network. However, due to network issues or problems with the time server, this centralized system may fail causing the initialization of time for any new device to be unsuccessful until problems with the time server are resolved.

SUMMARY OF THE INVENTION

Methods, apparatuses, and computer program products for synchronizing time across a plurality of devices connected to a network are provided. Embodiments include detecting, by a particular device, a synchronization initiation event; in response to detecting the synchronization initiation event, broadcasting, by the particular device to each device of the plurality of devices, a synchronization request; receiving, by the particular device, a plurality of time acknowledgments from the plurality of devices, each time acknowledgement indicating a current time of a device and a device initialization time indicating a time that the device last set the current time of the device; selecting, from the plurality of time acknowledgements, by the particular device, the time acknowledgement with the shortest duration between an indicated device initialization time and an indicated current time of a device; and setting, by the particular device, a current time of the particular device based on the current time indicated in the selected time acknowledgment.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
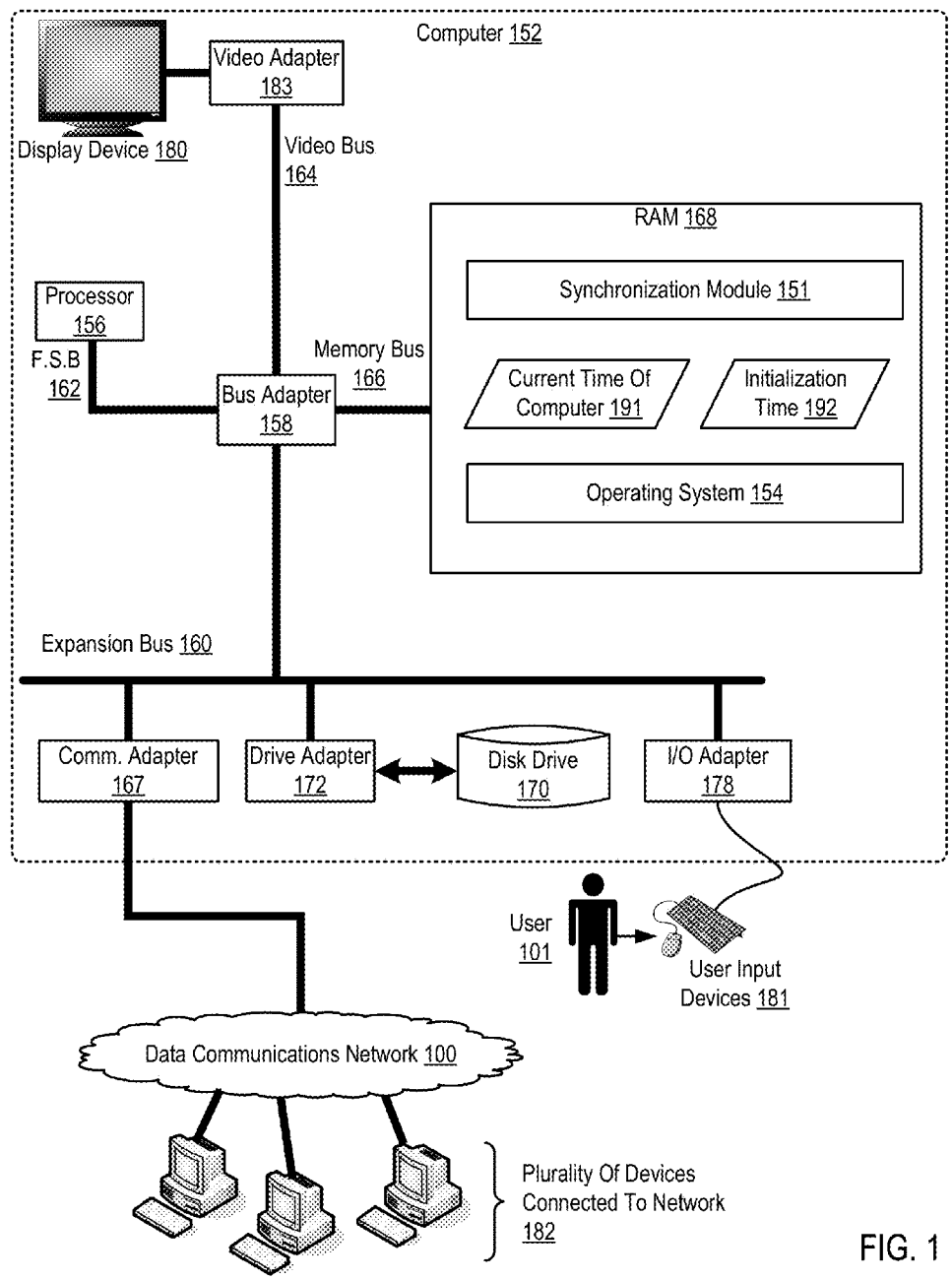
FIG. 1 sets forth a block diagram of automated computing machinery comprising an exemplary computer useful in synchronizing time across a plurality of devices connected to a network according to embodiments of the present invention.

Exemplary methods, apparatuses, and computer program products for synchronizing time across a plurality of devices connected to a network in accordance with the present invention are described with reference to the accompanying drawings, beginning with FIG. 1. Synchronizing time across a plurality of devices connected to a network in accordance with the present invention is generally implemented with computers, that is, with automated computing machinery. FIG. 1 sets forth a block diagram of automated computing machinery comprising an exemplary computer (152) useful in synchronizing time across a plurality of devices connected to a network according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is a synchronization module (151) configured for synchronizing time across a plurality of devices connected to a network in accordance with the present invention. Specifically, the synchronization module (151) includes computer program instructions that when executed by the processor (156) cause the computer (152) to carry out the steps of detecting, by the computer, a synchronization initiation event; in response to detecting the synchronization initiation event, broadcasting, by the computer to each device of the plurality (182) of devices connected to the network (100), a synchronization request; receiving, by the computer (152), a plurality of time acknowledgments from the plurality (182) of devices, each time acknowledgement indicating a current time of a device and a device initialization time indicating a time that the device last set the current time of the device; selecting, from the plurality of time acknowledgements, by the computer (152), the time acknowledgement with the shortest duration between an indicated device initialization time and an indicated current time of a device; and setting, by the computer (152), a current time (191) of the computer (152) based on the current time indicated in the selected time acknowledgment.

Because the computer (152) uses the current time of other devices (182) on the network (100) to set a current time (191) of the computer (152), the devices of the network (100) do not have to rely on a time server to provide the current time. As such, time synchronization according to embodiments of the present invention, may be accomplished without a time server. Furthermore, the computer (152) sets the current time (191) of the computer (152) based on the most recently initialized current time of any device connected to the network (100)—the device having a current time that is least likely to be affected by clock drift which generally increases over time. In addition, the synchronization module (151) is also configured to store an initialization time (192) of the computer (152) indicating when the current time (191) of the computer (152) was last set. The computer (152) is configured to transmit the particular device initialization time (192) along with the current time (191) to any device on the network (100) requesting the current time.

Also stored in RAM (168) is an operating system (154). Operating systems useful image compression according to embodiments of the present invention include UNIX™ Linux™ Microsoft 7™ AIX™ IBM's i5/OS™, iOS™, Android™, and others as will occur to those of skill in the art. The operating system (154) and the synchronization module (151) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for synchronizing time across a plurality of devices connected to a network according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (183), which is an example of an I/O adapter specially designed for graphic output to a display device (180) such as a display screen or computer monitor. The video adapter (183) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for synchronizing time across a plurality of devices connected to a network according to embodiments of the present invention include modems for wired dial-up communications, Ethernet (IEEE 802.3) adapters for wired data communications network communications, and 802.11 adapters for wireless data communications network communications.

Figure 2:
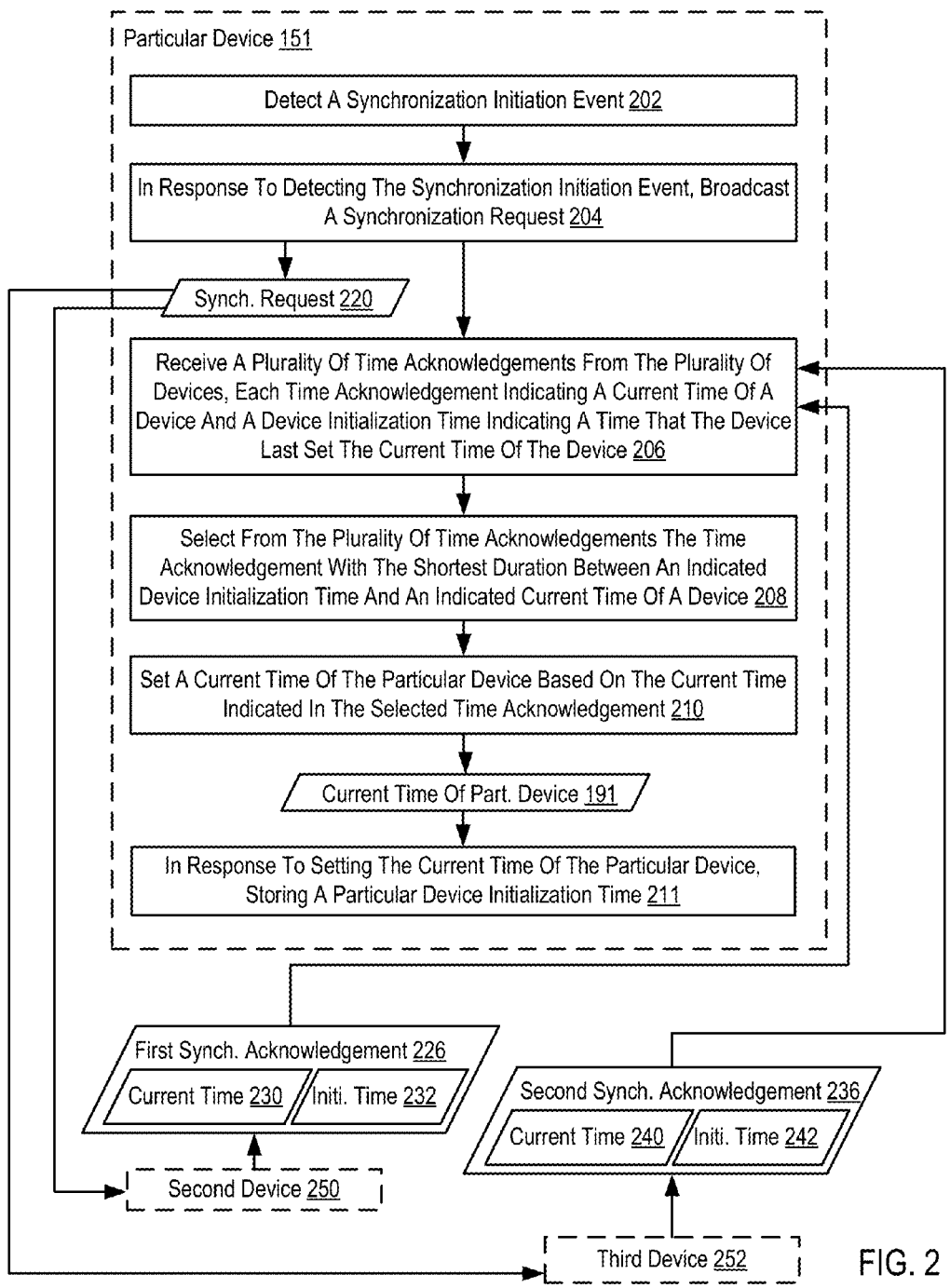
FIG. 2 sets forth a flow chart illustrating an exemplary method for synchronizing time across a plurality of devices connected to a network according to embodiments of the present invention.

For further explanation, FIG. 2 sets forth a flow chart illustrating an exemplary method for synchronizing time across a plurality of devices connected to a network according to embodiments of the present invention. The method of FIG. 2 includes detecting (202), by the particular device (151), a synchronization initiation event. A synchronization event is any event upon occurrence of which the particular device (151) begins synchronization of its current time with another device. Examples of synchronization events include the particular device (151) connecting to a network; the particular device (151) recovering from a loss of power; the duration between the current time (191) of the particular device and the initialization time (192) of the particular device (151) exceeding a predetermined amount; and the current time (191) of the particular device (151) matching a predetermined time or a predetermined date. For example, the particular device (151) may synchronize its current time (191) in response to the current time (191) indicating midnight or the date for daylight savings time change. Detecting (202) a synchronization initiation event may be carried out by receiving an indication that the particular device (151) is connected to a network; receiving an indication that the particular device (151) has recovered from a power loss; comparing the current time (191) to the initialization time (192) to determine a duration between the two time; comparing the duration between the initialization time (192) and the current time (191) to a predetermined amount; comparing the current time (191) of the particular device to a predetermined time or a predetermined date.

The method of FIG. 2 includes broadcasting (204), by the particular device (151) to each device of the plurality of devices (250, 252) in response to detecting the synchronization initiation event, a synchronization request (220). Broadcasting (204) to each device of the plurality of devices (250, 252) a synchronization request (220) may be carried out by transmitting a synchronization request (220) to every device capable of tracking a current time and transmitting an indication of the current time.

The method of FIG. 2 includes receiving (206), by the particular device (151), a plurality of time acknowledgments (226, 236) from the plurality of devices (250, 252), each time acknowledgement indicating a current time (230, 240) of a device and a device initialization time (232, 242) indicating a time that the device last set the current time (230, 240) of the device. Receiving (206) a plurality of time acknowledgments (226, 236) from the plurality of devices (250, 252) may be carried out by receiving, from one or more devices on the network that are capable of tracking time and transmitting an indication of time, a current time and an initialization time.

The method of FIG. 2 includes selecting (208), from the plurality of time acknowledgements (226, 236), by the particular device (151), the time acknowledgement with the shortest duration between an indicated device initialization time and an indicated current time of a device. Selecting (208), from the plurality of time acknowledgements (226, 236), the time acknowledgement with the shortest duration between an indicated device initialization time and an indicated current time of a device may be carried out by storing the device initialization time and current time of each time acknowledgements; comparing each device initialization time to its corresponding current time to determine a duration for the time acknowledgement; determining which duration is the shortest; and storing an indication of which time acknowledgement corresponds with the determined shortest duration.

The method of FIG. 2 includes setting (210), by the particular device (151), a current time (191) of the particular device (151) based on the current time indicated in the selected time acknowledgment. Setting (210) a current time (191) of the particular device (151) based on the current time indicated in the selected time acknowledgment may be carried out by determining which current time corresponds with the selected time acknowledgement; adjusting the current time indicated in the selected time acknowledgement based on a loss of time between transmission of the time acknowledgement and the receipt and processing of the selected time acknowledgement; and storing the adjusted current time as the current time (191) of the particular device (151).

The method of FIG. 2 includes storing (211), by the particular device (151) in response to setting (210) the current time (191) of the particular device (151), a particular device initialization time (192) indicating a time that the particular device (151) last set the current time (191) of the particular device (151). Storing (211) in response to setting (210) the current time (191) of the particular device (151), a particular device initialization time (192) indicating a time that the particular device (151) last set the current time (191) of the particular device (151) may be carried out by detecting the setting of the current time (191) of the particular device (151); and storing an indication of the current time (191) when the current time (191) is set; and storing the indication of the current time (191) when the current time (191) is set as the particular device initialization time (192) of the particular device (151).

Figure 3:
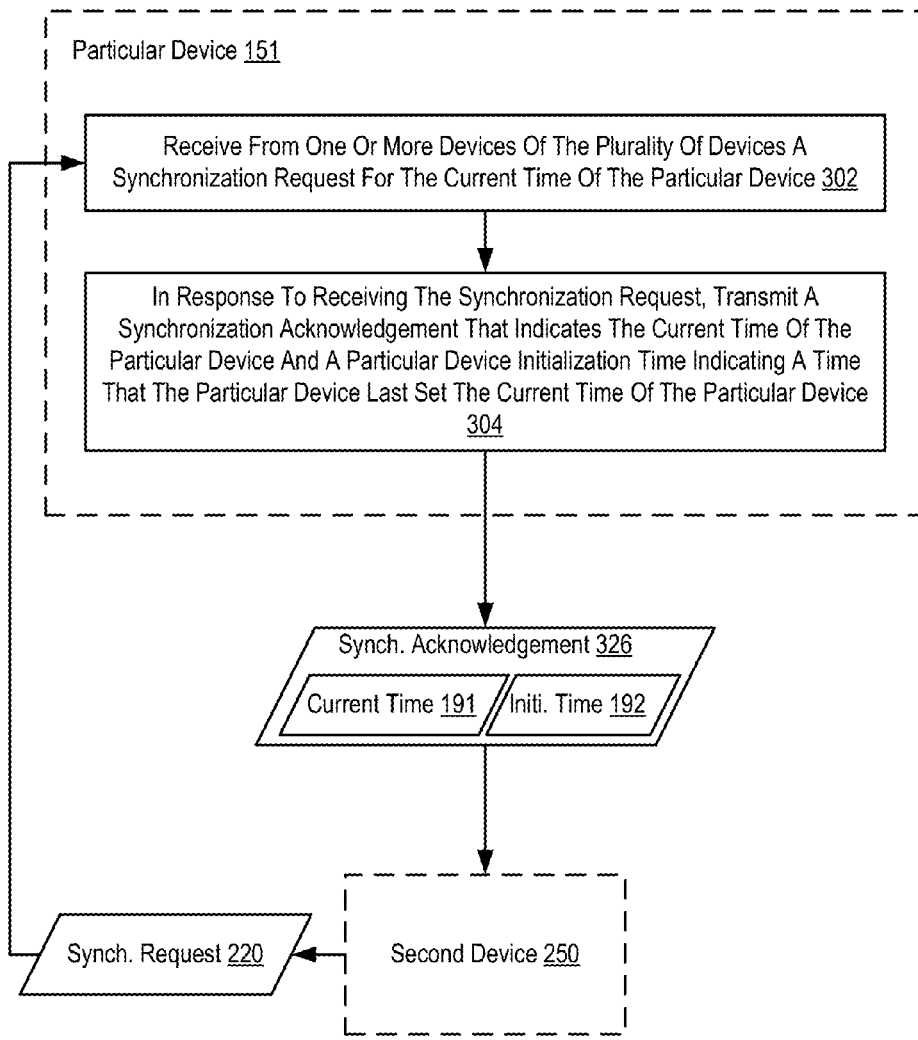
FIG. 3 sets forth a flow chart illustrating a further exemplary method for synchronizing time across a plurality of devices connected to a network according to embodiments of the present invention.

For further explanation, FIG. 3 sets forth a flow chart illustrating a further exemplary method for synchronizing time across a plurality of devices connected to a network according to embodiments of the present invention. As explained above, the method of FIG. 2 is concerned with the particular device (151) establishing a new current time for the particular device (151) based on a current time of another device of the network. In the method of FIG. 3, however, the particular device (151) is providing the current time (191) of the particular device (151) to another device (250) of the network so that the other device (250) may establish its current time based on the current time (191) of the particular device (151).

Specifically, the method of FIG. 3 includes receiving (302) from one or more devices (250) of the plurality of devices, by the particular device (151), a synchronization request (220) for the current time (191) of the particular device (151). Receiving (302) from one or more devices (250) of the plurality of devices a synchronization request (220) for the current time (191) of the particular device (151) may be carried out by receiving via a communication adapter a message containing a synchronization request.

The method of FIG. 3 also includes in response to receiving the synchronization request (220), transmitting (304), by the particular device (151), a synchronization acknowledgement (326) that indicates the current time (191) of the particular device (151) and a particular device initialization time (192) indicating a time that the particular device (151) last set the current time (191) of the particular device (151). Transmitting (304) a synchronization acknowledgement (326) that indicates the current time (191) of the particular device (151) and a particular device initialization time (192) indicating a time that the particular device (151) last set the current time (191) of the particular device (151) may be carried out by determining for every synchronization request, the identity of the originating device; storing the identities of the originating devices; based on the stored identities of the originating devices, transmitting a synchronization acknowledgement to each originating device.

Figure 4:
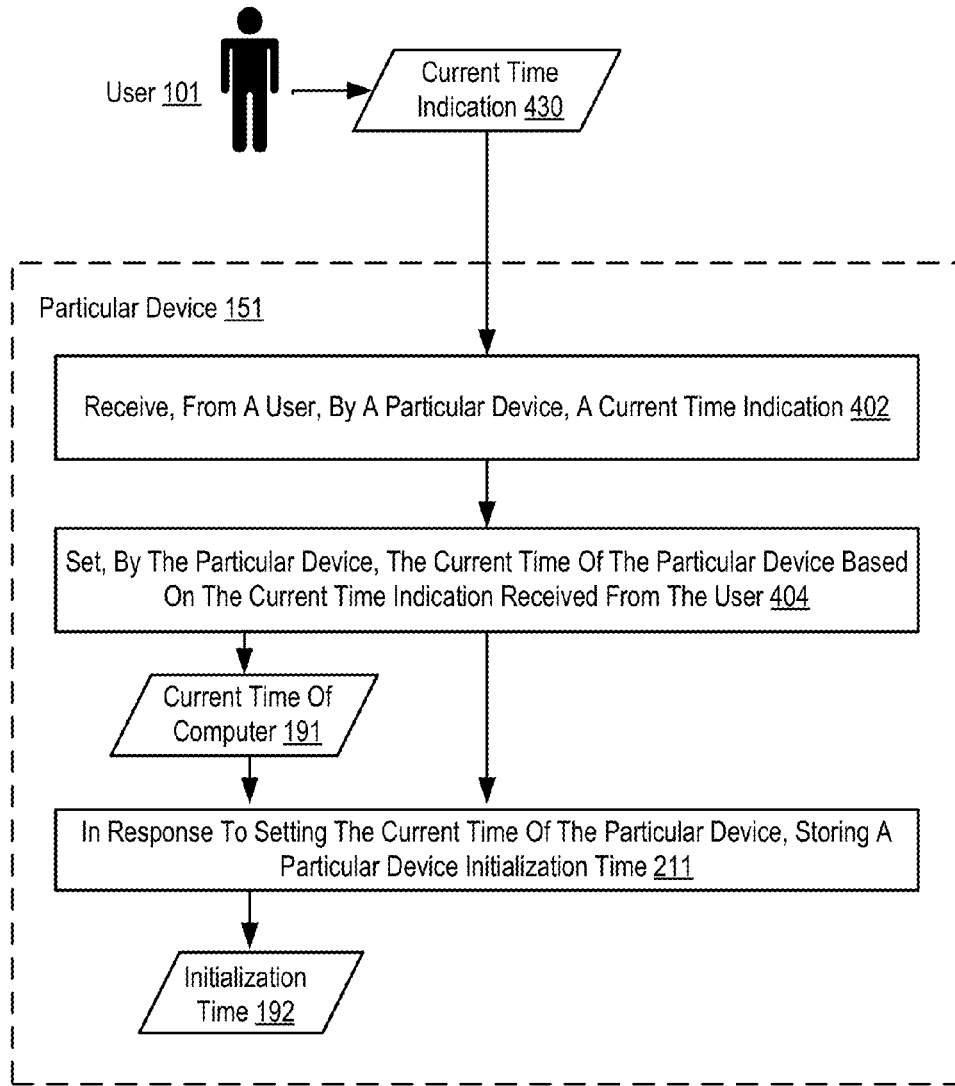
FIG. 4 sets forth a flow chart illustrating a further exemplary method for synchronizing time across a plurality of devices connected to a network according to embodiments of the present invention.

For further explanation, FIG. 4 sets forth a flow chart illustrating a further exemplary method for synchronizing time across a plurality of devices connected to a network according to embodiments of the present invention. The method of FIG. 4 is similar to the method of FIG. 2 in that the method of FIG. 4 also includes storing (211), by the particular device (151) in response to setting (210) the current time (191) of the particular device (151), a particular device initialization time (192) indicating a time that the particular device (151) last set the current time (191) of the particular device (151).

As explained above, the method of FIG. 3 is concerned with the particular device (151) providing the current time (191) of the particular device (151) to another device (250) of the network so that the other device (250) may establish its current time based on the current time (191) of the particular device (151). In the method of FIG. 4, however, the particular device (151) sets its current time (191) based on a user input. In this case, if every device on the network has lost power, one device may set a current time based on user input and then propagate that current time to the other devices on the network, as described in the method of FIG. 3.

The method of FIG. 4 includes receiving (402) from a user (101), by a particular device (151), a current time indication (430). Receiving (402) from a user (101) a current time indication (430) may be carried out by receiving automatically a time indication from a time server or other device external to the network; and receiving a manually a time indication from a user via a user input device.

The method of FIG. 4 also includes setting (404), by the particular device (151), the current time (191) of the particular device (151) based on the current time indication (430) received from the user (101). Setting (404) the current time (191) of the particular device (151) based on the current time indication (430) received from the user (101) may be carried out by adjusting the current time indication to correspond with a current time entry and storing the current time entry as the current time of the particular device.

Exemplary embodiments of the present invention are described largely in the context of a fully functional computer system for synchronizing time across a plurality of devices connected to a network. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of synchronizing time across a plurality of devices connected to a network, the method comprising:
   detecting, by a particular device, a synchronization initiation event;
   in response to detecting the synchronization initiation event, broadcasting, by the particular device to each device of the plurality of devices, a synchronization request;
   receiving, by the particular device, a plurality of time acknowledgments from the plurality of devices, each time acknowledgement indicating a current time of a device and a device initialization time indicating a time that the device last set the current time of the device;
   selecting, from the plurality of time acknowledgements, by the particular device, the time acknowledgement with the shortest duration between an indicated device initialization time of a device and an indicated current time of the device; and
   setting, by the particular device, a current time of the particular device based on the current time indicated in the selected time acknowledgment.

2. The method of claim 1 further comprising in response to setting the current time of the particular device, storing, by the particular device, a particular device initialization time indicating a time that the particular device last set the current time of the particular device.

3. The method of claim 1 wherein the synchronization initiation event includes the particular device connecting to the network.

4. The method of claim 1 wherein the synchronization initiation event includes the particular device losing power.

5. The method of claim 1 wherein the synchronization initiation event includes the current time of the particular device matching a predetermined time or a predetermined date.

6. The method of claim 1 further comprising:
receiving from one or more devices of the plurality of devices, by the particular device, a synchronization request for the current time of the particular device; and
in response to receiving the synchronization request, transmitting, by the particular device, a synchronization acknowledgement that indicates the current time of the particular device and a particular device initialization time indicating a time that the particular device last set the current time of the particular device.

7. The method of claim 1 further comprising:
receiving from a user, by a particular device, a current time indication; and
setting, by the particular device, the current time of the particular device based on the current time indication received from the user.

8. An apparatus for synchronizing time across a plurality of devices connected to a network, the apparatus comprising a particular device that includes a computer processor, a computer memory operatively coupled to the computer processor, the computer memory having disposed within it computer program instructions that when executed by the computer processor cause the apparatus to carry out the steps of:
detecting, by the particular device, a synchronization initiation event;
in response to detecting the synchronization initiation event, broadcasting, by the particular device to each device of the plurality of devices, a synchronization request;
receiving, by the particular device, a plurality of time acknowledgments from the plurality of devices, each time acknowledgement indicating a current time of a device and a device initialization time indicating a time that the device last set the current time of the device;
selecting, from the plurality of time acknowledgements, by the particular device, the time acknowledgement with the shortest duration between an indicated device initialization time of a device and an indicated current time of the device; and
setting, by the particular device, a current time of the particular device based on the current time indicated in the selected time acknowledgment.

9. The apparatus of claim 8 further comprising in response to setting the current time of the particular device, storing, by the particular device, a particular device initialization time indicating a time that the particular device last set the current time of the particular device.

10. The apparatus of claim 8 wherein the synchronization initiation event includes the particular device connecting to the network.

11. The apparatus of claim 8 wherein the synchronization initiation event includes the particular device losing power.

12. The apparatus of claim 8 wherein the synchronization initiation event includes the current time of the particular device matching a predetermined time or a predetermined date.

13. The apparatus of claim 8 further comprising:
receiving from one or more devices of the plurality of devices, by the particular device, a synchronization request for the current time of the particular device; and
in response to receiving the synchronization request, transmitting, by the particular device, a synchronization acknowledgement that indicates the current time of the particular device and a particular device initialization time indicating a time that the particular device last set the current time of the particular device.

14. The apparatus of claim 8 further comprising:
receiving from a user, by a particular device, a current time indication; and
setting, by the particular device, the current time of the particular device based on the current time indication received from the user.

15. A computer program product for synchronizing time across a plurality of devices connected to a network, the computer program product disposed upon a computer readable storage medium, wherein the computer program product is not a signal, the computer program product comprising computer program instructions capable, when executed, of causing a computer to carry out the steps of:
detecting, by the particular device, a synchronization initiation event;
in response to detecting the synchronization initiation event, broadcasting, by the particular device to each device of the plurality of devices, a synchronization request;
receiving, by the particular device, a plurality of time acknowledgments from the plurality of devices, each time acknowledgement indicating a current time of a device and a device initialization time indicating a time that the device last set the current time of the device;
selecting, from the plurality of time acknowledgements, by the particular device, the time acknowledgement with the shortest duration between an indicated device initialization time of a device and an indicated current time of the device; and
setting, by the particular device, a current time of the particular device based on the current time indicated in the selected time acknowledgment.

16. The computer program product of claim 15 further in response to setting the current time of the particular device, storing, by the particular device, a particular device initialization time indicating a time that the particular device last set the current time of the particular device.

17. The computer program product of claim 15 wherein the synchronization initiation event includes the particular device connecting to the network.

18. The computer program product of claim 15 wherein the synchronization initiation event includes the particular device losing power.

19. The computer program product of claim 15 wherein the synchronization initiation event includes the current time of the particular device matching a predetermined time or a predetermined date.

20. The computer program product of claim 15 further comprising:
receiving from one or more devices of the plurality of devices, by the particular device, a synchronization request for the current time of the particular device; and
in response to receiving the synchronization request, transmitting, by the particular device, a synchronization acknowledgement that indicates the current time of the particular device and a particular device initialization time indicating a time that the particular device last set the current time of the particular device.

* * * * *